(12) United States Patent
Park et al.

(10) Patent No.: US 10,800,402 B2
(45) Date of Patent: Oct. 13, 2020

(54) HYBRID VEHICLE AND METHOD OF CONTROLLING DRIVING MODE THEREFOR

(71) Applicants: HYUNDAI MOTOR COMPANY, Seoul (KR); KIA MOTORS CORPORATION, Seoul (KR)

(72) Inventors: Joon Young Park, Seoul (KR); Jea Mun Lee, Seoul (KR); Jung Min Cha, Incheon (KR); Sung Deok Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 434 days.

(21) Appl. No.: 15/850,798

(22) Filed: Dec. 21, 2017

(65) Prior Publication Data

US 2019/0031182 A1    Jan. 31, 2019

(30) Foreign Application Priority Data

Jul. 31, 2017  (KR) .................. 10-2017-0096909

(51) Int. Cl.
*B60W 20/40*   (2016.01)
*B60W 20/13*   (2016.01)

(52) U.S. Cl.
CPC ............ *B60W 20/40* (2013.01); *B60W 20/13* (2016.01); *B60W 2510/0676* (2013.01); *B60W 2530/12* (2013.01); *B60W 2556/00* (2020.02); *B60W 2710/06* (2013.01); *B60W 2710/08* (2013.01)

(58) Field of Classification Search
CPC ...... B60W 20/12; B60W 20/13; B60W 20/16; B60W 20/40; B60W 2510/0676; B60W 2520/10; B60W 2530/12; B60W 2552/05; B60W 2552/15; B60W 2552/20; B60W 2556/00; B60W 2710/06; B60W 2710/08; B60W 2540/10; B60Y 2300/474
See application file for complete search history.

(56) References Cited

U.S. PATENT DOCUMENTS

| 8,560,155 | B2 * | 10/2013 | Kedar-Dongarkar ................. B60W 20/00 701/22 |
| 8,731,752 | B2 * | 5/2014 | Yu .......................... B60W 10/26 701/22 |
| 8,774,993 | B2 * | 7/2014 | Harada .................. B60K 6/365 701/22 |
| 9,046,015 | B2 * | 6/2015 | Habu ................... F02D 41/0255 |
| 9,132,833 | B2 * | 9/2015 | Hokoi .................... B60W 20/40 |
| 9,970,364 | B2 * | 5/2018 | Yokoyama ............ H02J 7/1438 |
| 10,471,950 | B2 * | 11/2019 | Kim ...................... B60W 10/06 |

(Continued)

*Primary Examiner* — Angelina Shudy
(74) *Attorney, Agent, or Firm* — Morgan, Lewis & Bockius LLP

(57) ABSTRACT

A method of controlling a mode change in a hybrid vehicle for performing a driving-mode change related to a change in the amount of charge of a battery in consideration of catalyst warmup of an engine includes activating adaptive mode change control between a first mode and a second mode, determining whether or not catalyst heating or engine warmup is performed in advance, setting a mode change reference depending on a result of the determining, and performing the adaptive mode change control depending on the set mode change reference.

19 Claims, 5 Drawing Sheets

(56) References Cited

U.S. PATENT DOCUMENTS

| | | | |
|---|---|---|---|
| 2012/0150374 A1* | 6/2012 | Yamazaki | B60K 6/445 |
| | | | 701/22 |
| 2016/0297424 A1* | 10/2016 | Park | B60W 20/16 |
| 2016/0363107 A1* | 12/2016 | Jang | B60K 6/48 |
| 2017/0096980 A1* | 4/2017 | Jang | F02P 19/02 |
| 2018/0170360 A1* | 6/2018 | Kim | B60W 30/192 |
| 2018/0186382 A1* | 7/2018 | Le Cam | B60W 50/06 |
| 2019/0126910 A1* | 5/2019 | Kim | B60W 10/08 |
| 2019/0308490 A1* | 10/2019 | Obuchi | B60K 6/22 |

* cited by examiner

--RELATED ART--

--RELATED ART--

--RELATED ART--

--RELATED ART--

HYBRID VEHICLE AND METHOD OF CONTROLLING DRIVING MODE THEREFOR

This application is based on and claims the benefit of priority to Korean Patent Application No. 10-2017-0096909, filed on Jul. 31, 2017 with the Korean Intellectual Property Office, which is hereby incorporated by reference as if fully set forth herein.

TECHNICAL FIELD

The present disclosure relates to a hybrid vehicle and a method of controlling a driving mode therefor, and more particularly to a hybrid vehicle, which is capable of performing a driving-mode change depending on a change in the state of charge of a battery in consideration of catalyst warmup of an engine, and a control method thereof.

BACKGROUND

In general, a hybrid electric vehicle (HEV) is a vehicle that uses two types of power sources together, and the two types of power sources are typically an engine and an electric motor. Such a vehicle has excellent fuel efficiency and power performance and is advantageous in that the amount of exhaust gas is reduced, compared to a vehicle having only an internal combustion engine, and thus has been actively developed in recent years.

The HEV may be operated in two driving modes depending on the types of power trains that are driven. One of the two driving modes is an electric-vehicle (EV) mode in which the HEV is driven using only an electric motor and the other mode is a hybrid-electric-vehicle (HEV) mode in which the HEV obtains power by operating both an electric motor and an engine. The HEV changes between the two modes depending on conditions during driving.

In addition to the classification of a driving mode depending on the type of a power train described above, in particular, in the case of a plug-in hybrid electric vehicle (PHEV), a driving mode may be classified into a charge-depleting (CD) mode and a charge-sustaining (CS) mode based on a change in a battery state-of-charge (SOC). In general, the PHEV is driven by operating an electric motor using battery power without engine power in a CD mode, and uses engine power to prevent a further reduction in the battery SOC in a CS mode.

A general PHEV is driven in a CD mode, regardless of a driving condition, such as driving load, whether or not a battery requires charging, or a distance to a destination, and then performs a change from the CD mode to a CS mode due to the depletion of an SOC. This will be described with reference to FIG. 1.

FIG. 1 is an illustrative view showing an example of the case in which a general plug-in hybrid electric vehicle (PHEV) performs a mode change.

In FIG. 1, horizontal axes of two graphs (i.e., upper and lower) indicate distance, a vertical axis of an upper graph indicates the battery state-of-charge (SOC) of the PHEV, and a vertical axis of a lower graph indicates driving load.

First, referring to the lower graph of FIG. 1, downtown road, national highway, and expressway sections coexist between a starting point and a destination, and a path along which driving load is relatively lowered in the stated order of expressway-national highway-downtown road is present. When the general PHEV is driven along the path, the vehicle starts driving in a CD mode without consideration of a change in driving load, and then, performs a change from the CD mode to a CS mode when the SoC is lowered below a predetermined reference.

However, the CD mode has relatively advantageous efficiency during low speed/low load driving and the CS mode has relatively advantageous efficiency during high speed/high load driving. Accordingly, as described above, when a mode change is performed based on an SoC value alone, driving load is not considered, and thus, efficiency may be highly degraded on some paths.

In order to overcome the problem described above, an adaptive CD/CS mode change method may be considered. The adaptive CD/CS mode change method is a control method of automatically changing CD and CS modes to achieve optimum efficiency using a distance until charge (DUC) as a distance to next recharging, a distance to empty (DTE) as a driving distance range in an EV mode, driving conditions, navigation information, and the like when the vehicle travels a longer distance than an all electric range (AER) as a driving distance range using an electric motor alone.

For example, when the adaptive CD/CS mode change method is applied, a vehicle may drive in a CS mode when current driving load is equal to or greater than a predetermined value based on driving conditions, and the vehicle may drive in a CD mode when the driving load is low. Needless to say, when DUC≤DTE even if the vehicle travels through a section with high driving load, the vehicle may deplete an SOC via driving in the CD mode, and thus may be guided to deplete an SOC within the DUC. The adaptive CD/CS mode change method will be described below with reference to FIG. 2.

FIG. 2 is an illustrative view showing an example of the case in which a general PHEV performs a mode change when an adaptive CD/CS mode change method is applied.

In FIG. 2, the meaning of the horizontal and vertical axes and path configuration are assumed to be the same as in FIG. 1.

Referring to FIG. 2, the vehicle may start driving in a CD mode, but, when the vehicle enters a section (here, an expressway) with driving load that exceeds preset driving load, the vehicle may perform a change to a CS mode even if an SOC is equal to or greater than a predetermined value, and then may again perform a change to the CD mode in a section with DUC≤DTE, which enables effective driving.

When the vehicle starts driving in a CD mode, the vehicle is driven without starting an engine until the CD mode is changed to a CS mode. Therefore, the engine remains in a cooled state at the point in time at which the CD mode is changed to the CS mode. Thus, it may be difficult to satisfy exhaust gas regulations due to a low catalyst temperature in an engine catalytic converter when the power of the engine is immediately used. In conclusion, the vehicle uses the engine after performing catalyst heating, i.e. engine warmup control, by which the catalytic converter is raised to a normal operating temperature, in order to satisfy the regulations. This will be described below with reference to FIG. 3.

FIG. 3 is an illustrative view showing an example of the case in which a general PHEV performs engine warmup upon a mode change. Referring to FIG. 3, the PHEV, which performs a mode change based on an SOC, performs warmup control once at the time of a change from a CD mode to a CS mode. At this time, a reference value is set to be slightly higher than an SOC, which is a reference for changing from a CD mode to a CS mode, and warmup control is performed when an SOC reaches the corresponding reference value. As such, warmup may be completed before the actual change from the CD mode to the CS mode.

However, in an adaptive CD/CS mode change method, since a mode change depending on driving load may be repeated several times or more depending on driving conditions, and since a CS driving distance is variable depending on a driving path, there may be problems with engine warmup. This will be described below with reference to FIG. 4.

FIG. 4 is an illustrative view for explaining a problem when an adaptive CD/CS mode change method is applied to a general PHEV.

Referring to FIG. 4, the vehicle performs engine warmup control upon a change from a CD mode to a CS mode based on an increase in driving load, but, when the vehicle is shortly driven in the CS mode and then immediately again performs a change to the CD mode, fuel efficiency may be deteriorated due to the fuel consumed for warmup. In addition, since the vehicle has difficulty in knowing a catalyst temperature when the vehicle changes from the CS mode to the CD mode and then again enters the CS mode, when engine warmup is uniformly performed whenever the vehicle enters the CS mode, engine warmup may be repeatedly performed even if the catalyst temperature is sufficiently high due to a short CD mode section after a previous CS mode, which may waste fuel.

SUMMARY

Accordingly, the present disclosure is directed to a hybrid vehicle and a method of controlling a driving mode therefor that substantially obviate one or more problems due to limitations and disadvantages of the related art.

An object of the present disclosure is to provide a method of more efficiently controlling a mode change in a hybrid vehicle and a vehicle in which the same is implemented.

More particularly, an object of the present disclosure is to provide a method of performing a driving-mode change in consideration of engine warmup efficiency, and a vehicle in which the same is implemented.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a mode change in a hybrid vehicle includes activating, by a hybrid control unit (HCU), adaptive mode change control between a first mode and a second mode, determining, by the HCU, whether or not catalyst heating or engine warmup is performed in advance, setting, by the HCU, a mode change reference depending on a result of the determining, and performing, by the HCU, the adaptive mode change control depending on the set mode change reference.

In another aspect of the present disclosure, a hybrid vehicle includes an engine, and a hybrid control unit (HCU) configured to determine whether or not catalyst heating or warmup of the engine is performed in advance when adaptive mode change control between a first mode and a second mode is activated, and set a mode change reference depending on a determined result so as to perform control so that the adaptive mode change control is performed depending on the set mode change reference.

It is to be understood that both the foregoing general description and the following detailed description of the present disclosure are exemplary and explanatory and are intended to provide further explanation of the present disclosure as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in more detail to a hybrid vehicle and an efficient transmission control method for the same according to the present disclosure, examples of which are illustrated in the accompanying drawings. With respect to constituent elements used in the following description, suffixes "module" and "unit" are given or mingled with each other only in consideration of ease in the preparation of the specification, and do not have or serve as different meanings.

First, the structure of a hybrid vehicle, to which embodiments of the present disclosure may be applied, will be described with reference to FIG. 5.

Figure 1:
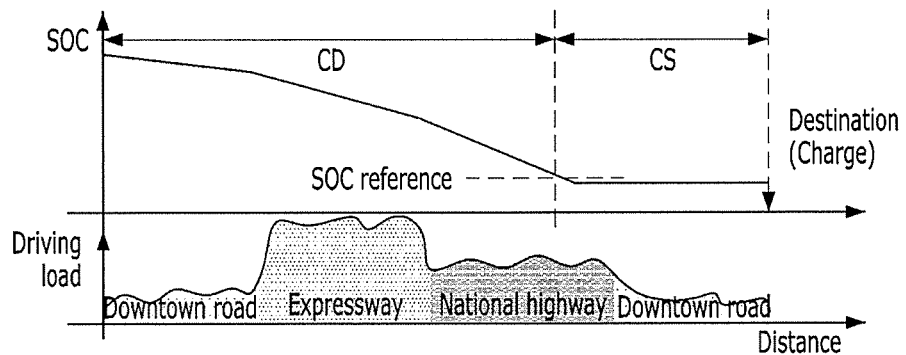
FIG. 1 is an illustrative view showing an example of the case in which a general plug-in hybrid electric vehicle performs a mode change.
Figure 2:
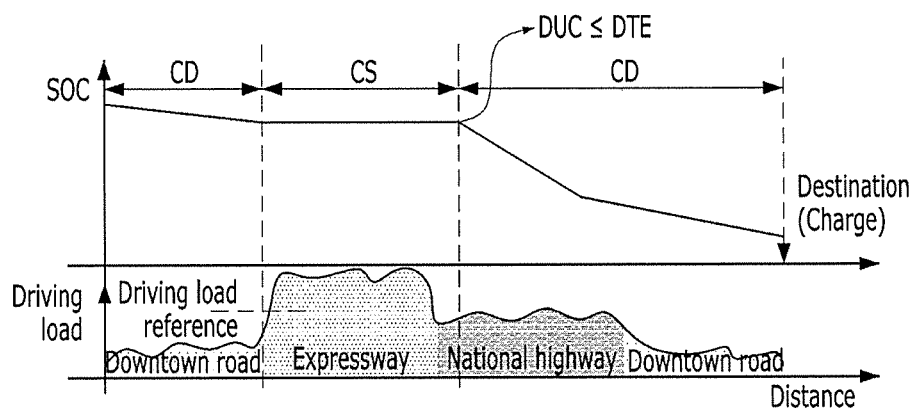
FIG. 2 is an illustrative view showing an example of the case in which a general plug-in hybrid electric vehicle performs a mode change when an adaptive CD/CS mode change method is applied.
Figure 3:
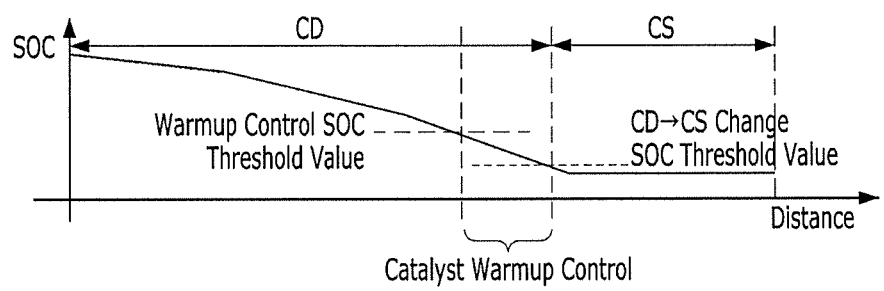
FIG. 3 is an illustrative view showing an example of the case in which a general plug-in hybrid electric vehicle performs engine warmup upon a mode change.
Figure 4:
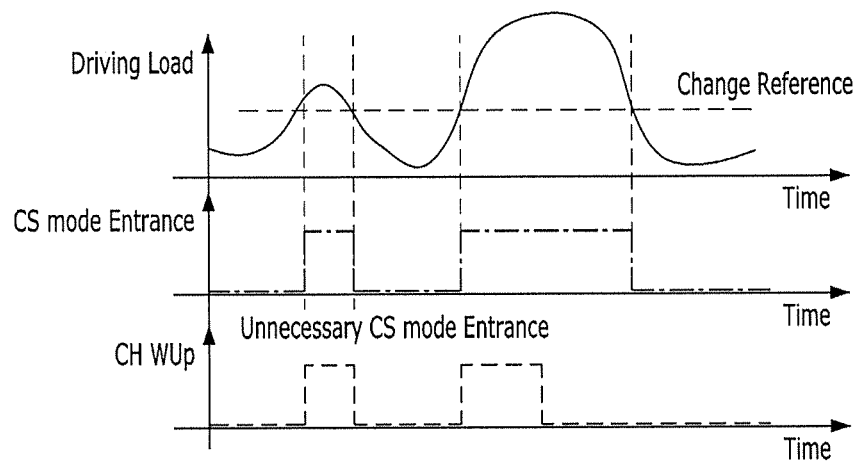
FIG. 4 is an illustrative view for explaining a problem when an adaptive CD/CS mode change method is applied to a general plug-in hybrid electric vehicle.
Figure 5:
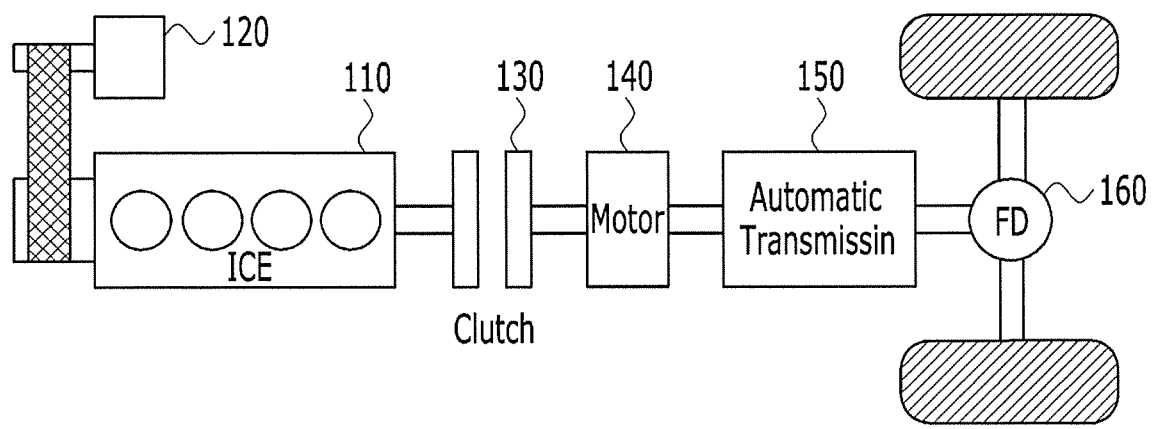
FIG. 5 is an illustrative view showing an example of the power train structure of a hybrid vehicle to which embodiments of the present disclosure may be applied.

FIG. 5 is an illustrative view showing an example of the power train structure of a hybrid vehicle to which embodiments of the present disclosure may be applied.

Referring to FIG. 5, there is illustrated a power train of a hybrid vehicle, which adopts a parallel-type hybrid system in which an electric motor (or a driving motor) 140 and an engine clutch 130 are mounted between an internal combustion engine (ICE) 110 and a transmission 150.

In this vehicle, generally, when a driver steps on an accelerator after starting, the motor 140 is first driven using power of a battery in an open state of the engine clutch 130 so that power of the motor 140 moves wheels by way of the transmission 150 and a final drive (FD) 160 (i.e. EV mode). When a greater driving force is gradually required as the vehicle is gradually accelerated, an auxiliary motor (or a starter generator motor) 120 may be operated so as to start the engine 110.

Thereby, when the rotational speeds of the engine 110 and the motor 140 become equal to each other, the engine clutch 130 is finally engaged so that both the engine 110 and the motor 140 drive the vehicle (i.e. transition from an EV mode to an HEV mode). Then, when a predetermined engine-off condition such as, for example, vehicle deceleration, is satisfied, the engine clutch 130 is opened and the engine 110 stops (i.e. transition from an HEV mode to an EV mode). At this time, the vehicle recharges a battery using driving force of wheels via a motor, which is referred to as braking energy regeneration or regenerative braking. Thus, the starter generator motor 120 may function as a starter motor when the engine is turned on, and may function as a generator after the engine is turned on or when rotational energy is recovered during engine off, and thus the starter generator motor 120 may also be referred to as a hybrid starter generator (HSG).

Figure 6:
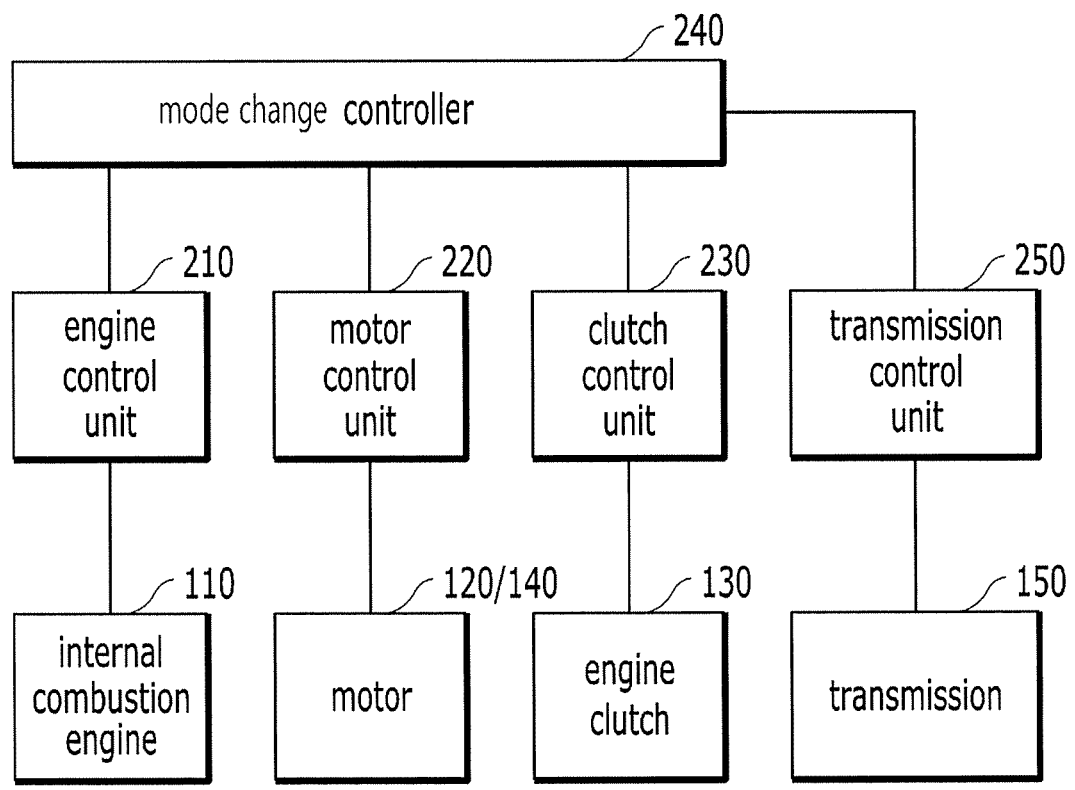
FIG. 6 is a block diagram illustrating an example of the control system of a hybrid vehicle to which embodiments of the present disclosure may be applied.

The relationship between control units in the vehicle in which the above-described power train is applied is illustrated in FIG. 6.

FIG. 6 is a block diagram illustrating an example of the control system of a hybrid vehicle to which embodiments of the present disclosure may be applied.

Referring to FIG. 6, in the hybrid vehicle to which embodiments of the present disclosure may be applied, the internal combustion engine 110 may be controlled by an engine control unit 210, the starter generator motor 120 may be controlled in torque by a motor control unit (MCU) 220, and the engine clutch 130 may be controlled by a clutch control unit 230. Here, the engine control unit 210 is also referred to as an engine management system (EMS). In addition, the transmission 150 is controlled by a transmission control unit 250.

The respective control units may be connected to a mode change controller 240 (hereinafter also referred to as a "hybrid control unit (HCU)"), which is a superordinate control unit and performs an overall mode change process, and may provide the mode change controller 240 with information required for a driving-mode change, engine clutch control upon gear shift, and/or information required for engine off control, or may perform an operation based on a control signal under the control of the mode change controller 240.

The mode change controller 240 is an electric circuitry that executes instructions of software which thereby performs various functions described hereinafter.

More specifically, the mode change controller 240 determines whether or not to perform a mode change based on vehicle driving conditions. In one example, the mode change controller 240 determines a point in the time at which the engine clutch (EC) 130 is opened, and performs hydraulic control (in the case of a wet-type EC) or torque capacity control (in the case of a dry-type EC) when the EC 130 is opened. In addition, the mode change controller 240 may determine the state of the EC 130 (e.g. lock-up, slip, or open) and may control the point in time at which the engine 110 stops fuel injection. In addition, the mode change controller 240 may control the torque of the starter generator motor 120 for engine off control, thereby controlling the recovery of engine rotational energy. In addition, the mode change controller 240 may determine whether or not a CD-CS mode change condition according to the present embodiment, which will be described later, is satisfied, and may perform overall control required for a mode change and control of subordinate control units depending thereon.

Needless to say, it would be obvious to one of ordinary skill in the art that the aforementioned relationship between the control units and functions/divisions of the control units are exemplary and, thus, are not limited to the terms. For example, the mode change controller 240 may be embodied by allowing any one of other control units except for the mode change controller 240 to provide a corresponding function, or two or more of other control units may distribute and provide the corresponding function.

In addition, the respective components have been described based on a parallel-type hybrid power train in FIGS. 5 and 6, but embodiments of the present disclosure are not limited as to the type so long as the hybrid power train enables a change between a CD mode and a CS mode.

Hereinafter, a method of controlling a mode change more efficiently according to an embodiment of the present embodiment will be described based on the above-described vehicle structure.

As described above, in a general adaptive CD/CS mode change method, inefficient control may occur so that engine warmup is performed whenever a vehicle enters a CS mode in which the vehicle uses an engine, in the situation in which a change between a CD mode and a CS mode frequently occurs due to driving conditions. In order to prevent this, the present embodiment proposes to variably set a driving load reference, which is the condition for a mode change in the vehicle, depending on whether or not catalyst heating/engine warmup is performed. Here, the driving load may be estimated as the combination of a vehicle speed, a requested torque, a road level, and the like, but these are merely given by way of example, and the present embodiment is not limited as to the method of estimating driving load.

Figure 7:
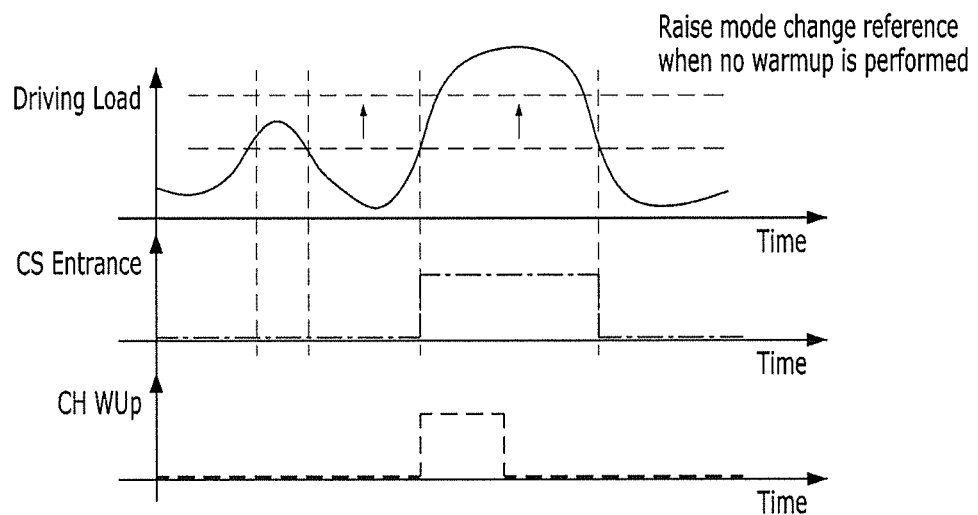
FIG. 7 is an illustrative view showing the case in which a driving load reference is raised in a hybrid vehicle according to an embodiment of the present disclosure, and FIG. is an illustrative view showing the case in which the driving load reference is lowered.

The case in which a driving load reference is changed according to the present embodiment will be described below with reference to FIGS. 7 and 8. FIG. 7 is an illustrative view showing the case in which a driving load reference is raised in a hybrid vehicle according to an embodiment of the present disclosure, and FIG. 8 is an illustrative view showing the case in which the driving load reference is lowered.

First, referring to FIG. 7, when catalyst heating/engine warmup is not performed, a driving load reference is raised to prevent catalyst heating/engine warmup from sensitively occurring in response to temporary driving load.

Figure 8:
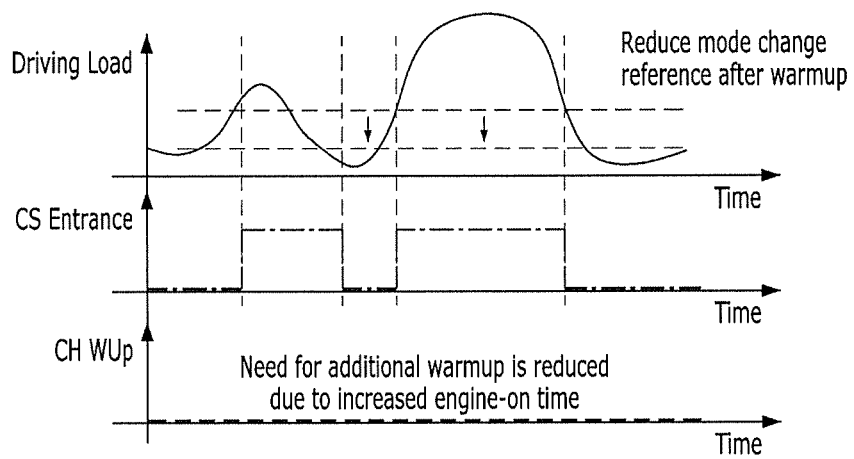

In addition, referring to FIG. 8, when catalyst heating/engine warmup is performed in advance, a driving load reference is lowered to thus maximally maintain a warmup state. Thus, need for additional warmup may be reduced due to an increase in the engine starting time.

In the above description, a driving load reference is set in a variable manner depending on whether or not catalyst heating/engine warmup is performed. According to another embodiment, a driving load reference may remain intact, and a delay from the time at which a driving load reference is satisfied to the time at which an actual mode change occurs may be set so that the length of the delay may be changed in a variable manner depending on whether or not catalyst heating/engine warmup is performed. That is, a mode change may be performed when a driving load reference is satisfied even after the delay, and the delay may be increased when engine warmup is not performed, but may be reduced when engine warmup is performed, which may have the same effect as variably setting the driving load reference.

Needless to say, the two methods may be combined with each other.

Figure 9:
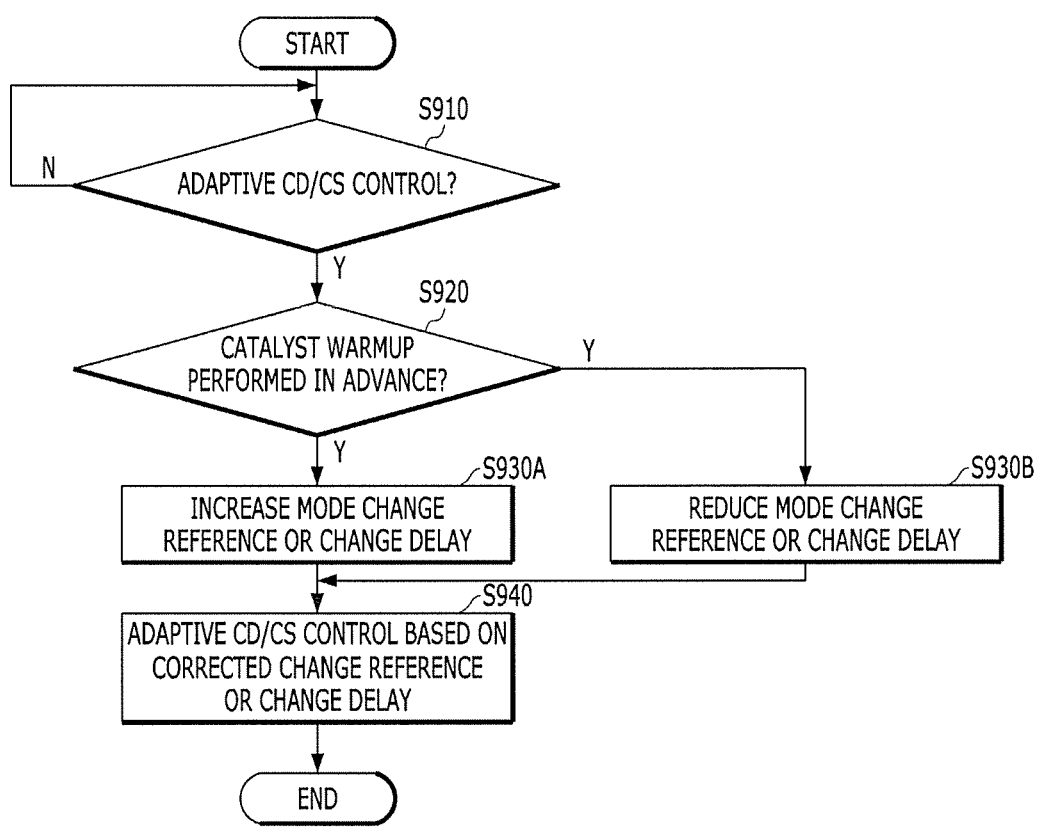
FIG. 9 is a flowchart illustrating an example of a process of setting a variable driving load reference depending on whether or not engine warmup is performed in a hybrid vehicle according to an embodiment of the present disclosure.

FIG. 9 is a flowchart illustrating an example of a process of setting a variable driving load reference depending on whether or not engine warmup is performed in a hybrid vehicle according to an embodiment of the present disclosure.

Referring to FIG. 9, first, when adaptive CD/CS mode change control is set to be applied (S910), whether or not catalyst heating/engine warmup is performed in advance may be determined (S920). When catalyst heating/engine warmup is performed in advance, a driving load reference, which is a mode change reference, may be lowered, or a mode change delay may be reduced (S930B), and otherwise, the driving load reference may be raised, or the mode change delay may be increased (S930A).

When the driving load reference or the delay is changed via the above-described process, adaptive CD/CS mode change control may be performed based on the changed reference/delay (S940).

In the above-described process, whether or not catalyst heating is performed in advance (S920) may be determined based on whether or not a predetermined time has passed since an engine-off time point after the engine is operated for a given time, or may be determined using a catalyst temperature in an exhaust gas catalytic converter. The catalyst temperature may use a sensor value when a temperature sensor is provided, or may be determined using at least one of the temperature of cooling water, a vehicle speed, or a time that has passed since the engine was stopped when no temperature sensor is provided.

In addition, step S920 may be performed at a predetermined cycle. Of course, when repeatedly performing step S920, steps S930A and S930B may be performed so as to maintain the mode change reference/mode change delay intact when the result is the same as the result of the previous determination of whether or not catalyst heating/engine warmup was performed.

The invention described above may be implemented as computer readable code in a medium in which a program is recorded. Computer readable recording media include all kinds of recording devices in which data readable by computer systems is stored. The computer readable recording media include a Hard Disk Drive (HDD), a Solid State Drive (SSD), a Silicon Disk Drive (SDD), a ROM, a RAM, a CD-ROM, a magnetic tape, a floppy disk, an optical data storage system, etc.

As is apparent from the above description, a hybrid vehicle according to at least one embodiment of the present disclosure having the above-described configuration may more efficiently control a mode change.

In particular, since control is performed to adjust a mode change reference depending on whether or not warmup is performed, it is possible to prevent unnecessary engine warmup, and consequently, enhance fuel efficiency.

It will be appreciated by persons skilled in the art that that the effects that could be achieved with the present disclosure are not limited to what has been particularly described hereinabove and other advantages of the present disclosure will be more clearly understood from the above detailed description taken in conjunction with the accompanying drawings.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A method of controlling a mode change in a hybrid vehicle, the method comprising:
    activating, by a hybrid control unit (HCU), adaptive mode change control between a first mode and a second mode;
    determining, by the HCU, whether or not catalyst heating or engine warmup is previously performed;
    setting, by the HCU, a mode change reference depending on a result of the determining; and
    performing, by the HCU, the adaptive mode change control depending on the set mode change reference.

2. The method according to claim 1, wherein the set mode change reference comprises at least one of a driving load reference or a mode change delay.

3. The method according to claim 2, wherein the current driving load is determined via at least one of a vehicle speed, a requested torque, or a road level.

4. The method according to claim 2, wherein the setting comprises reducing at least one of the driving load reference or the mode change delay when the result of the determining is that the catalyst heating or the engine warmup is previously performed.

5. The method according to claim 2, wherein the setting comprises increasing at least one of the driving load reference or the mode change delay when the result of the determining is that the catalyst heating or the engine warmup is not previously performed.

6. The method according to claim 1, wherein whether or not the catalyst heating or the engine warmup is previously performed is determined using a catalyst temperature in an exhaust gas catalytic converter.

7. The method according to claim 6, wherein the catalyst temperature is determined using at least one of a cooling water temperature, a vehicle speed, or a time that has passed since engine stoppage.

8. The method according to claim 1, wherein the determining is repeatedly performed at a predetermined cycle, and when a result of repeated implementation is identical to a result of previous implementation, the setting is performed so as to maintain the set mode change reference.

9. The method according to claim 1, wherein the first mode comprises a charge-depleting (CD) mode, and the second mode comprises a charge-sustaining (CS) mode.

10. A non-transitory computer-readable recording medium in which a program for executing the method of controlling a mode change in a hybrid vehicle according to claim 1 is recorded.

11. A hybrid vehicle comprising:
    an engine; and
    a hybrid control unit (HCU) configured to determine whether or not catalyst heating or warmup of the engine is previously performed when adaptive mode change control between a first mode and a second mode is activated, and set a mode change reference depending on a determined result so as to perform control so that the adaptive mode change control is performed depending on the set mode change reference.

12. The hybrid vehicle according to claim 11, wherein the set mode change reference comprises at least one of a driving load reference or a mode change delay.

13. The hybrid vehicle according to claim 12, wherein the current driving load is determined via at least one of a vehicle speed, a requested torque, or a road level.

14. The hybrid vehicle according to claim 12, wherein the HCU reduces at least one of the driving load reference or the mode change delay when the determined result is that the catalyst heating or the engine warmup is previously performed.

15. The hybrid vehicle according to claim 12, wherein the HCU increases at least one of the driving load reference or the mode change delay when the determined result is that the catalyst heating or the engine warmup is not previously performed.

16. The hybrid vehicle according to claim 11, wherein whether or not the catalyst heating or the engine warmup is previously performed is determined using a catalyst temperature in an exhaust gas catalytic converter.

17. The hybrid vehicle according to claim 16, wherein the catalyst temperature is determined using at least one of a cooling water temperature, a vehicle speed, or a time that has passed since engine stoppage.

18. The hybrid vehicle according to claim 11, wherein the HCU repeatedly performs determination of whether or not the catalyst heating or the engine warmup is previously performed at a predetermined cycle, and when a result of repeated implementation is identical to a result of previous implementation, the HCU maintains the set mode change reference.

19. The hybrid vehicle according to claim 11, wherein the first mode comprises a charge-depleting (CD) mode, and the second mode comprises a charge-sustaining (CS) mode.

* * * * *